US010683104B2

(12) United States Patent
Vestergaard et al.

(10) Patent No.: US 10,683,104 B2
(45) Date of Patent: Jun. 16, 2020

(54) CONVEYOR SYSTEM (71) Applicant: MV INVEST APS, Gadstrup (DK)

(72) Inventors: Martin Vestergaard, Roskilde (DK); Jens Bonde, Roskilde (DK); Andreas Frandsen, Kr. Eskilstrup (DK)

(73) Assignee: MV INVEST APS, Gadstrup (DK)

( * ) Notice: Subject to any disclaimer, the term of this patent is extended or adjusted under 35 U.S.C. 154(b) by 0 days.

(21) Appl. No.: 16/342,412

(22) PCT Filed: Nov. 3, 2017

(86) PCT No.: PCT/IB2017/056868
§ 371 (c)(1),
(2) Date: Apr. 16, 2019

(87) PCT Pub. No.: WO2018/083641
PCT Pub. Date: May 11, 2018

(65) Prior Publication Data
US 2019/0248513 A1 Aug. 15, 2019

(30) Foreign Application Priority Data
Nov. 4, 2016 (WO) .................. PCT/IB2016/056651

(51) Int. Cl.
B65G 41/02 (2006.01)
B64F 1/36 (2017.01)
(Continued)

(52) U.S. Cl.
CPC ............ *B64F 1/368* (2013.01); *B65G 41/002* (2013.01); *B65G 41/02* (2013.01); *B65G 67/08* (2013.01); *B65G 67/24* (2013.01); *B65G 47/04* (2013.01)

(58) Field of Classification Search
CPC ........ B65G 21/12; B65G 21/14; B65G 21/22; B65G 21/2054; B65G 41/02; B65G 41/002; B65G 47/647
(Continued)

(56) References Cited

U.S. PATENT DOCUMENTS 2,938,614 A * 5/1960 Hewitt, Jr. ............. B65G 13/12
193/35 TE
3,103,284 A * 9/1963 Hawkes ................. B65G 67/00
414/788.7
(Continued)

FOREIGN PATENT DOCUMENTS

WO WO 2015/028019 A1 3/2015

OTHER PUBLICATIONS

Anonymous: "BEUMER Group Baggage Unloader", Dec. 6, 2015, pp. 1-4, XP055386886, URL:http://www.aviationpros.com/product/12125683/beumer-group-beumer-group-baggage-unloader.
(Continued)

*Primary Examiner* — Joseph A Dillon, Jr.
(74) *Attorney, Agent, or Firm* — Birch, Stewart, Kolasch & Birch, LLP (57) ABSTRACT A conveyor system for transferring a transport item between a transport unit and a loading area or an unloading belt of a baggage handling conveyor system in an airport. The conveyor system comprises a rail assembly for placement adjacent the unloading belt, and one or more transfer conveyors for placement on the rail assembly. The rail assembly comprises a guide rail, and a base for mounting said rail assembly on a building floor extending. The transfer conveyor comprises a transfer conveyor belt for supporting the transport item. The transfer conveyor is slidable mounted on the guide rail for sliding the one or more transfer conveyors along the guide rail.

20 Claims, 9 Drawing Sheets (51) Int. Cl.
*B65G 41/00* (2006.01)
*B65G 67/08* (2006.01)
*B65G 67/24* (2006.01)
*B65G 47/04* (2006.01)

(58) Field of Classification Search
USPC ....... 198/370.09, 364, 597, 598, 629, 861.5; 108/138
See application file for complete search history.

(56) References Cited

U.S. PATENT DOCUMENTS

| | | | |
|---|---|---|---|
| 3,684,073 A | 8/1972 | Giles | |
| 3,780,843 A * | 12/1973 | McGovern, Jr. | B65G 13/12 193/35 TE |
| 3,876,060 A * | 4/1975 | Stease | B65G 13/12 198/632 |
| 4,311,425 A * | 1/1982 | Pulda | B65G 57/245 187/279 |
| 4,478,329 A | 10/1984 | Heiz | |
| 4,723,647 A * | 2/1988 | Norton | B65G 47/766 119/57.7 |
| 4,860,973 A * | 8/1989 | Fenner | B64C 1/22 244/137.1 |
| 5,938,151 A | 8/1999 | Takasan et al. | |
| 6,397,999 B1 * | 6/2002 | Taylor | B65G 13/12 186/2 |
| 7,234,590 B1 * | 6/2007 | Le Borgne | B65G 21/12 198/592 |
| 9,233,805 B2 * | 1/2016 | Nyquist | B65G 65/00 |
| 10,131,505 B2 * | 11/2018 | Lagziel | B65G 47/54 |
| 10,407,183 B2 * | 9/2019 | Potters | B65G 9/002 |
| 2003/0029694 A1 * | 2/2003 | Gilmore | B65G 21/14 198/313 |
| 2005/0011728 A1 * | 1/2005 | Ledingham | B65G 21/2054 198/453 |
| 2005/0155846 A1 * | 7/2005 | Sofranec | B65G 17/08 198/779 |
| 2008/0118337 A1 * | 5/2008 | Vestergaard | B64D 9/00 414/340 |
| 2012/0097498 A1 * | 4/2012 | Campbell | B65G 13/12 198/317 |
| 2016/0046450 A1 | 2/2016 | Fourney et al. | |
| 2016/0185531 A1 * | 6/2016 | Fransen | B65G 17/067 198/617 |
| 2018/0282074 A1 * | 10/2018 | Nothum, Jr. | A23P 20/12 |

OTHER PUBLICATIONS

International Preliminary Examination Report (PCT/IPEA/409 and PCT/IPEA/416), issued in PCT/IB2017/056868, dated Oct. 1, 2018.
International Search Report (PCT/ISA/210) issued in PCT/IB2017/056868, dated Feb. 7, 2018.
Schneider Electric: "Application Notes: Roller Conveyor (2003)", Dec. 11, 2005, pp. 1-6. XP055423399, URL:http://static.schneider-electric.us/docs/Machine Control/0105DB0301.pdf.
Written Opinion (PCT/ISA/237) issued in PCT/IB2017/056868, dated Feb. 7, 2018.

* cited by examiner

CONVEYOR SYSTEM

The present invention relates to a conveyor system for transferring a transport item between a transport unit and a loading area or an unloading belt of a baggage handling conveyor system in an airport.

The transport item may be baggage such as a suitcase or odd sized luggage such as a bicycle or a baby stroller. The transport item may also be a parcel or a letter.

The baggage handling conveyor system in an airport is used to automatically move transport items between areas of the airport. For example, baggage, which has been checked in at a ticket counter, is transported from the ticket counter to a loading area. Similarly, baggage that has arrived at the airport is transported from an unloading area to baggage claims or to a loading area for a connecting airplane.

The transport unit is used to transport a number of transport items back and forth to an airplane parked at a gate.

For a small airplane the transport items are held in the airplane cargo hold as individual transport items. In such a case the transport items are transported back and forth to the airplane as individual transport items on the transport unit. A transport unit for transporting individual transport items is normally referred to as a baggage cart or a baggage dolly. A baggage cart has side walls for keeping the individual transport items on the baggage cart.

For a large airplane the transport items are held in the airplane cargo hold in a number of unit load devices. A unit load device is a standardized container for holding individual transport items. The unit load device can be loaded on and off the airplane. Thus, for a large airplane the transport items are normally transported back and forth to the airplane in the unit load devices, which are carried by a container dolly.

In the present context a transport unit refers to a baggage cart for transporting individual transport items or a container dolly with a unit load device in which the individual transport items are held.

The transport unit is typically arranged in a train of transport units being pulled by a tractor.

In the unloading area of the airport the train of transport units are parked next to the unloading belt. The transport units are parked about 50-100 cm from the unloading belt such that there is room for opening a dropside of the individual transport units towards the unloading belt and such that a baggage handler can maneuver between the transport units and the unloading belt. The baggage handler manually moves the transport items across the gap between the transport units and the unloading belt.

The baggage handler moves the transport items one item at a time so that the transport items are spaced apart from each other on the unloading belt such that the transport items do not pile together and cause a blocking in the baggage handling conveyor system.

It is important that the transport items are moved from the transport unit to the unloading belt as fast as possible so that passengers can proceed directly to baggage claim as they have deboarded the airplane in order to claim the baggage without delays. It is especially important in cases where transport items are to be transported to a connecting flight.

For a departing airplane, baggage, which have been checked in, and other transport items are accumulated in a loading area corresponding to the gate at which the departing airplane is parked. In the loading area the transport items are manually moved onto the transport unit.

The task of manually moving baggage back and forth between the transport unit and the baggage handling conveyor system is hard physical labour.

An example of a conveyor system for transferring baggage between a transport unit and an unloading belt of a baggage handling conveyor system in an airport is described in the international patent application with publication number WO15028019, which is incorporated in the present application by reference.

The conveyor system described in WO15028019 consists of an item transfer conveyor belt extending across the gap between the transport unit and the unloading belt. The item transfer conveyor belt can be telescopically extended and has a frictionless surface. The baggage handler can thereby lift a transport item up on the item transfer conveyor belt and slide the transport item across the gap and onto the unloading belt.

The item transfer conveyor belt is supported by an arm connected to a column. The column may be suspended from an overhead structure or may rest on the building floor, preferably in a manner allowing the item transfer conveyor belt to be moved along the length of the baggage handling conveyor belt to be locked in a position aligned with any transport unit.

The present inventor has found that suspending an item transfer conveyor from the overhead structure places the conveyor system in the way of the baggage handler and results in the conveyor system being an obstacle to the baggage handler.

Resting the column on the building floor is not immediately possible, because it will take up the limited space between the transport unit and the baggage handling conveyor and will also result in the conveyor system being an obstacle to the baggage handler.

It is an object of the present invention to provide a conveyor system that is desirable for the baggage handler to use and which will not be an obstacle to the baggage handler. It is also an object of the present invention to provide a conveyor system that can rest on the building floor taking up as little space as possible between the transport unit and the unloading belt. It is a further object of the present invention to provide a conveyor system that is simple and easy to use for the baggage handler, and which is immediately available for use by the baggage handler.

The above object and advantages together with numerous other objects and advantages which will be evident from the below detailed description of the present invention are according to a first aspect of the present invention obtained by:

A conveyor system for transferring transport items between a transport unit and a loading area or an unloading belt of a baggage handling conveyor system in an airport, said conveyor system comprising:

a rail assembly (8) for placement adjacent said loading area or unloading belt (4), and at least one transfer conveyor (6) for placement on, and moving along said rail assembly (8)

said rail assembly (8) comprising:

a guide rail for guiding said transfer conveyor (6) along said rail assembly (8), and a mounting means for mounting said rail assembly (8) between said transport unit (2a) and said loading area or unloading belt (4), said transfer conveyor (6) comprising:

a carrying means having a transfer conveyor medium (22, 23) for transporting and supporting said transport items, and a first frame constituting a conveyor frame for supporting said transfer conveyor medium, said transfer conveyor medium comprising an outer surface for facing said transport items, said outer surface having a surface pattern for providing a static friction between said carrying means and said transport items when said transport items being in contact with said surface pattern, said transfer conveyor further comprising:

a first end, and a second end opposite said second end, and a motor for driving said conveyor medium such that said transports items being assisted onto said carrying medium by means of said surface pattern and moved between said first end and said second end as said conveyor medium being driven by said motor.

The carrying means may be a roller conveyor, a belt conveyor, a ball transfer conveyor, an apron/slat conveyor, a chain conveyor, a vibrating conveyor, or a slider conveyor. When the carrying means is implemented as a belt conveyor, the transfer conveyor medium is constituted by the belt. When the carrying means is implemented as a roller conveyor, the transfer conveyor medium is constituted by a number of conveying rollers. In general, the upwards facing surface between the first end, and the second end of the transfer conveyor may be driven by a motor in order to move and transport items.

The motor may be an electric motor or an hydraulic motor.

The transfer conveyor medium may be made in a material providing friction between the outer surface of the transfer conveyor medium and the transport item. The material may be polyurethane or PVC.

The surface pattern is to provide a friction between the outer surface of the transfer conveyor medium and the transport item, i.e. the surface pattern may include protrusions such as ribs for contacting a transport item and applying a force to the transport item such that it is transported by the transfer conveyor (the transport conveyor assists the baggage handler in getting the individual transport items onto the transport conveyor such that the baggage handler does not have to place the whole transport item on the transport conveyor before it can be transported).

Other surface patterns or protrusion patterns may be grass pattern, corrugated, spike shaped, saw tooth shaped, crescent shaped.

The transfer conveyor medium may extend in a direction 90°±45° to the rail assembly when the transfer conveyor is placed on the rail assembly.

The rail assembly may comprise a base with a number of supports extending horizontally from the bottom of the base for resting the rail assembly on a building floor. Preferably, the base comprises at least two supports. The supports may be bolted to the building floor.

The supports may be arranged below a work floor mat, which is placed on the floor between the transport unit and the unloading belt such that the baggage handler can stand securely and comfortably while handling the transfer items. In this way the supports are not in the way of the baggage handler. Preferably the height of an individual support is smaller than the height of the work floor mat.

The transfer conveyor may comprise a mechanical or electrical brake system for braking the transfer conveyor or keeping the transfer conveyor in a stationary position with respect to the rail assembly. The brake system may include a brake with a brake pad. When the brake is engaged the brake pad is pressed against a side of the rail assembly thereby providing friction between the brake and the rail assembly.

The brake may be engaged by the baggage handler or it may be engaged as a standard by the brake system.

The electrical brake system comprises a brake switch to be operated by the baggage handler The mechanical brake system comprises a first brake lever to be operated by the baggage handler for engaging or disengaging the brake. The first brake lever may be pivotally suspended and connected to the brake via a first crank and a first link. Additionally, the first brake lever may be connected to the brake via a second crank and a second link. Preferably, the first brake lever is operated by moving it up or down.

An end of the first brake lever may be provided with a brake lever knob. The brake lever knob provides grip such that a baggage handler can operate the brake lever with for example a knee or a foot without sliding the knee or foot out from the end of the first brake lever.

The brake lever may be positioned below the belt conveyor such that it can be operated with a knee or a foot while pushing or pulling the transfer conveyor along the rail assembly.

When the brake pad is engaged as a standard, the brake system may comprise a spring, which the brake pad is connected to. The brake pad may be mounted such that the spring as a standard is deflected from its equilibrium in a compressed state thereby acting on the brake pad and causing the brake pad to be engaged with the rail assembly. The spring may be a torsion spring, which the brake is pivotally connected to. When the brake is engaged as a standard the brake is disengaged from the rail assembly by further deflecting the spring.

The transfer conveyor may comprise a second frame, which the conveyor frame of the belt conveyor may be pivotally connected to. In this way the belt conveyor is suspended such that it can rotate around a first axis. The first axis extending in a horizontal plane.

The belt conveyor may comprise an elongated projection such as an obround projection. In the present context an obround projection has the form of a flattened cylinder. The obround projection has a width and a length, wherein the length is greater than the width. The second frame may comprise an C-shaped seat facing upwards for seating the obround projection. The opening of the C-shaped seat may be greater than a width of the obround projection, but smaller than a length of the obround projection such that the obround projected is to be inserted in the C-shaped seat in the longitudinal direction of the obround projection.

The transfer conveyor may comprise a front shaft for supporting the belt conveyor in a fixed position. In this way the belt conveyor may be moved or rotated by moving the front shaft back and forth. The front shaft may be moved back and forth by a first linear actuator driven by a first electric motor. Alternatively, the baggage handler may manually move the belt conveyor. When the baggage handler has moved the belt conveyor to a desired position the front shaft may be engaged in a notch of the transfer conveyor. The transfer conveyor may comprise a number of notches for the front shaft allowing the belt conveyor to be supported at a number of different heights or angles.

The belt conveyor may be locked to the transfer conveyor with a locking pin and a locking bolt. The locking bolt may engage the conveyor frame and the front shaft. When the belt conveyor is locked to the transfer conveyor the belt conveyor may rotate between an angle of −45° and an angle of 60° with respect to a horizontal plane. When the locking pin is removed the belt conveyor may be rotated to an angle of 90° allowing the obround projection of the belt conveyor to be taken out of the opening of the C-shaped projection.

In an embodiment the transfer conveyor comprises a third frame. The second frame is movable connected to the third frame such that the second frame may be moved between a retracted position and an extracted position. In such an embodiment the transfer conveyor has a two dimensional working area, where the belt conveyor may be positioned anywhere between an upper and a lower position and between a retracted and an extracted position. The third frame extends less than 400 mm from the rail assembly when the transfer conveyor is placed on the rail assembly.

The second frame may be pivotally connected to the third frame. In this way the second frame is suspended such that it can rotate around a second axis. The second frame may constitute an inner frame and the third frame may constitute an outer frame defining a space that may encompass the inner frame. In this way the inner frame may be placed within the outer frame when the inner frame is in a retracted position.

The transfer conveyor may comprise an inner shaft for supporting the inner frame in a fixed position. The inner shaft may be moved back and forth by a second linear actuator driven by a second electric motor. The first actuator and the second actuator may be controlled by a switch such as a toggle switch.

The transfer conveyor belt may comprise a surface pattern on the surface facing the baggage for providing a friction between the conveyor belt and baggage. The transfer conveyor belt may extend in a direction 90°±45° to the rail assembly when the transfer conveyor is placed on the rail assembly.

The guide rail of the rail assembly may comprise at least one track. Preferably, the guide comprises at least one guide track and one support track. The transfer conveyor may comprise at least one wheel for rolling in the track. The wheel may be attached to a side of the outer frame facing the rail assembly. The brake may engage the wheel instead of the rail assembly. Preferably, the transfer conveyor comprises at least one guide wheel and one support wheel. The guide wheel may have a vertical wheel axis and the support wheel may have a horizontal wheel axis.

The rail assembly may be bolted to a side of an unloading belt frame. For example, the mounting means may include a number of fasteners such as bolts or screws for inserting in aligned through holes in the rail assembly and the side of the unloading belt frame. Alternative, the rail assembly is welded to the side of the unloading belt frame.

The base may be attached to the guide rail or the guide rail and the base may be formed as an integral piece.

The transfer conveyor may comprise a deflector for deflecting transport items. The deflector may be implemented as a railing or a screen. Alternatively, the deflector may be implemented as a roller deflector, which may have the form of an upright cylinder for rotating about a vertical axis.

The deflector prevents a transfer item to be pulled away by the unloading belt before the transfer item is all the way onto the unloading belt such that the transfer item does not fall down on the floor.

The roller deflector may be electrical driven and rotate with a fixed speed. The speed may correspond to the speed of the unloading belt or the speed of the transfer conveyor belt. Alternatively, the roller deflector may rotate freely as it is contacted by the transfer item.

The deflector may be placed at a left side or a right side of the transfer conveyor. The deflector is mounted on a deflector frame. The deflector frame may comprise a number of deflector fixtures for attaching the deflector frame to the outer frame.

The deflector may be mirror symmetric with respect to the transfer conveyor such that the deflector may be placed on either the right side or the left side of the transfer conveyor and be a mirror image of the deflector had it been placed on the opposite side.

The deflector is placed at a height above the carrying means. The deflector may extend from the carrying means towards the unloading belt, and part of the deflector may extend over part of the unloading belt. The deflector extends the working area in which the transfer conveyor may operate on transfer items, because as a transfer item reaches the distal end it may come into contact with the deflector, which may direct it the rest of the way onto the unloading belt.

The transfer conveyor may comprise a handle such that a baggage handler can grip the handle and move the transfer conveyor along the rail assembly. The handle may be on top of the deflector such that the baggage handler conveniently can grip the handle. The handle may constitute a deflector handle.

The transfer conveyor may comprise a brake system for braking the transfer conveyor or keeping the transfer conveyor in a stationary position with respect to the rail assembly. The brake system may include a brake with a brake pad. When the brake is engaged the brake pad is pressed against a side of the rail assembly thereby providing friction between the brake and the rail assembly, said brake pad being mechanically, hydraulic or electrically operated.

The brake may be engaged by the baggage handler or it may be engaged as a standard by the brake system.

The brake system comprises a brake switch to be operated by the baggage handler

The brake system comprises a first brake lever to be operated by the baggage handler for engaging or disengaging the brake. The first brake lever may be pivotally suspended and connected to the brake via a first crank and a first link. Additionally, the first brake lever may be connected to the brake via a second crank and a second link. Preferably, the first brake lever is operated by moving it up or down.

An end of the first brake lever may be provided with a brake lever knob. The brake lever knob provides grip such that a baggage handler can operate the brake lever with for example a knee or a foot without sliding the knee or foot out from the end of the first brake lever.

The brake lever may be positioned below the belt conveyor such that it can be operated with a knee or a foot while pushing or pulling the transfer conveyor along the rail assembly.

When the brake pad is engaged as a standard, the brake system may comprise a spring, which the brake pad is connected to. The brake pad may be mounted such that the spring as a standard is deflected from its equilibrium in a compressed state thereby acting on the brake pad and causing the brake pad to be engaged with the rail assembly. The spring may be a torsion spring, which the brake is pivotally connected to. When the brake is engaged as a standard the brake is disengaged from the rail assembly by further deflecting the spring.

The transfer conveyor may comprise a second frame, which the conveyor frame of the belt conveyor may be pivotally connected to. In this way the belt conveyor is suspended such that it can rotate around a first axis. The first axis extending in a horizontal plane.

The carrying means may comprise an elongated projection such as an obround projection. In the present context an obround projection has the form of a flattened cylinder. The obround projection has a width and a length, wherein the length is greater than the width.

The second frame may comprise an C-shaped seat facing upwards for seating the obround projection. The opening of the C-shaped seat may be greater than a width of the obround projection, but smaller than a length of the obround projection such that the obround projected is to be inserted in the C-shaped seat in the longitudinal direction of the obround projection.

The transfer conveyor may comprise a front shaft for supporting the carrying means in a fixed position. In this way the carrying means may be moved or rotated by moving the front shaft back and forth. The front shaft may be moved back and forth by a first linear actuator driven by a first electric motor. Alternatively a hydraulic motor may be used instead of an electric motor.

When the carrying means has been moved to a desired position the front shaft may be engaged in a notch of the transfer conveyor. The transfer conveyor may comprise a number of notches for the front shaft allowing the carrying means to be supported at a number of different heights or angles.

The carrying means may be locked to the transfer conveyor with a locking pin and a locking bolt. The locking bolt may engage the first frame and the front shaft. When the carrying means is locked to the transfer conveyor the carrying means may rotate between an angle of −45° and an angle of 60° with respect to a horizontal plane. When the locking pin is removed the carrying means may be rotated to an angle of 90° allowing the obround projection of the carrying means to be taken out of the opening of the C-shaped projection.

In an embodiment the transfer conveyor comprises a third frame. The second frame is movable connected to the third frame such that the second frame may be moved between a retracted position and an extracted position. In such an embodiment the transfer conveyor has a two dimensional working area, where the carrying means may be positioned anywhere between an upper and a lower position and between a retracted and an extracted position. The third frame extends less than 400 mm from the rail assembly when the transfer conveyor is placed on the rail assembly.

The second frame may be pivotally connected to the third frame. In this way the second frame is suspended such that it can rotate around a second axis. The second frame may constitute an inner frame and the third frame may constitute an outer frame defining a space that may encompass the inner frame. In this way the inner frame may be placed within the outer frame when the inner frame is in a retracted position.

The transfer conveyor may comprise an inner shaft for supporting the inner frame in a fixed position. The inner shaft may be moved back and forth by a second linear actuator driven by a second electric motor. The first actuator and the second actuator may be controlled by a switch such as a toggle switch.

The guide rail of the rail assembly may comprise at least one track. Preferably, the guide comprises at least one guide track and one support track. The transfer conveyor may comprise at least one wheel for rolling in the track. The wheel may be attached to a side of the outer frame facing the rail assembly. The brake may engage the wheel instead of the rail assembly. Preferably, the transfer conveyor comprises at least one guide wheel and one support wheel. The guide wheel may have a vertical wheel axis and the support wheel may have a horizontal wheel axis.

The rail assembly may comprise an electric rail attached to the guide rail and may comprise a current collector for establishing an electric connection between the electric rail and an electric circuitry of the transfer conveyor. The current collector is movably mounted inside the electric rail such that the current collector can roll along with the transfer conveyor as the transfer conveyor 6 is moved along the rail assembly. This provides power to said transfer conveyor.

The conveyor system may comprise more than one transfer conveyor, such as two or three transfer conveyors. The transfer conveyors may be connected to each other.

The transfer conveyor may comprise a roller conveyor with conveying rollers for transporting and supporting transport items.

According to a second aspect of the present invention the above objects and advantages are obtained by:

A conveyor system for transferring transport items between a transport unit and a loading area or an unloading belt of a baggage handling conveyor system in an airport, said conveyor system comprises:

a rail assembly for placement adjacent said loading area or unloading belt, and at least one transfer conveyor for placement on, and moving along said rail assembly, wherein said rail assembly comprises:

a guide rail for guiding said transfer conveyor along said rail assembly, and mounting means for mounting said rail assembly between said transport unit (2a) and said loading area or unloading belt, wherein said transfer conveyor comprises a belt conveyor with a transfer conveyor belt for transporting and supporting transport items, a first frame constituting a belt frame for supporting said transfer conveyor belt, and a second frame, wherein said belt conveyor is pivotally connected to said second frame for moving said belt conveyor between an upper position and a lower position, said belt conveyor comprising a drive pulley powered by an electric motor and driving said transfer conveyor belt, said transfer conveyor belt comprising a surface pattern on the surface facing the transport item for providing a friction between said conveyor belt and the transport items.

The aspects of the invention will be explained in more detail below in connection with advantageous embodiments of the invention with reference to the drawings, in which.

The present invention wilt now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

Figure 1:
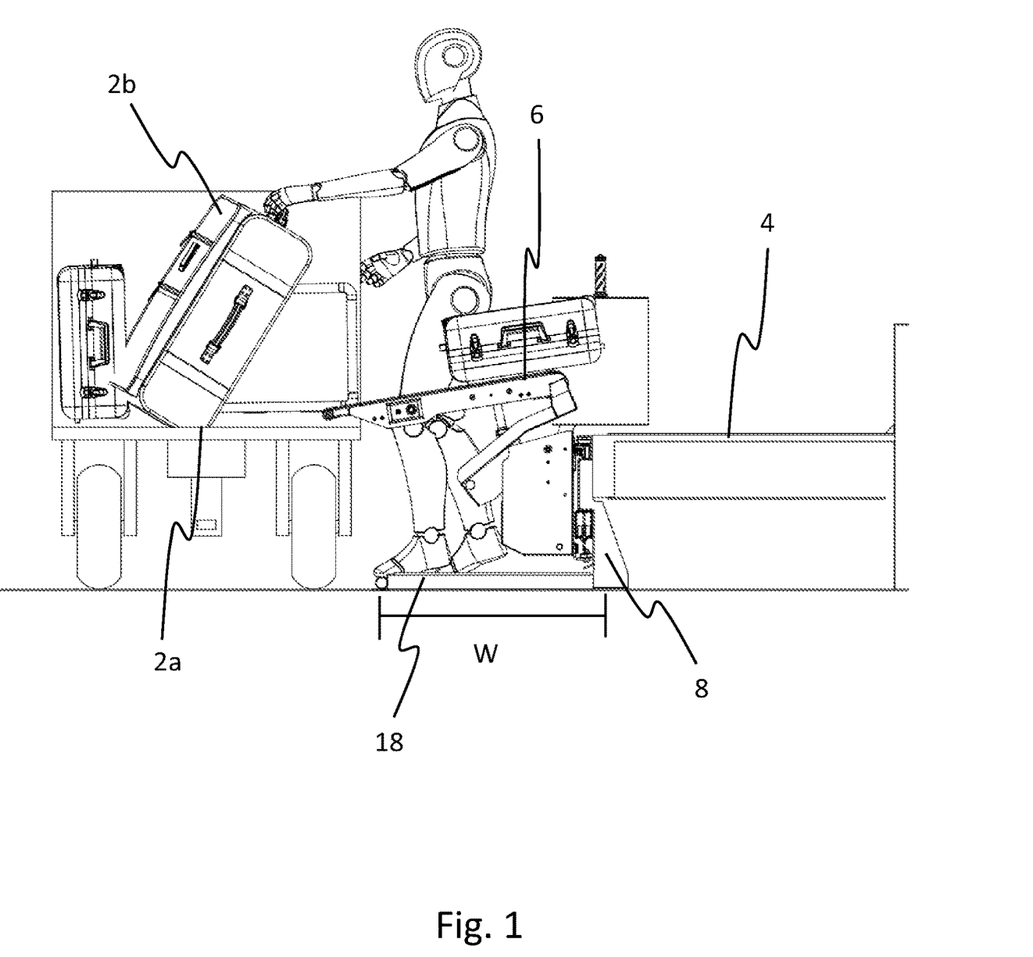
FIG. 1 is a perspective of a conveyor system installed between a transport unit and an unloading belt.

FIG. 1 shows a perspective of a conveyor system.

The conveyor system comprises a rail assembly 8 and a transfer conveyor 6. The conveyor system is installed on a building floor between a transport unit 2a and an unloading belt 4, which is part of a baggage handling conveyor system in an airport.

A required free space W exists between the transport unit 2a and the unloading belt 4. The free space W is about 50-100 cm wide. For example in Copenhagen Airport, Kastrup the free space is about 63 cm wide, but other airports have different dimensions for the free space. The transport unit 2a is to be parked outside the free space W allowing for baggage handling personnel to work in the free space W. A work floor mat 18 is placed on the floor of the free space such that the baggage handler can stand securely and comfortably while handling the transfer items.

The rail assembly 8 is placed adjacent to the unloading belt 4 as close as possible, and the transfer conveyor 6 is placed on the rail assembly 8. Transfer items 2b are transferred from the transport unit to the unloading belt via the conveyor system.

Figure 2A:
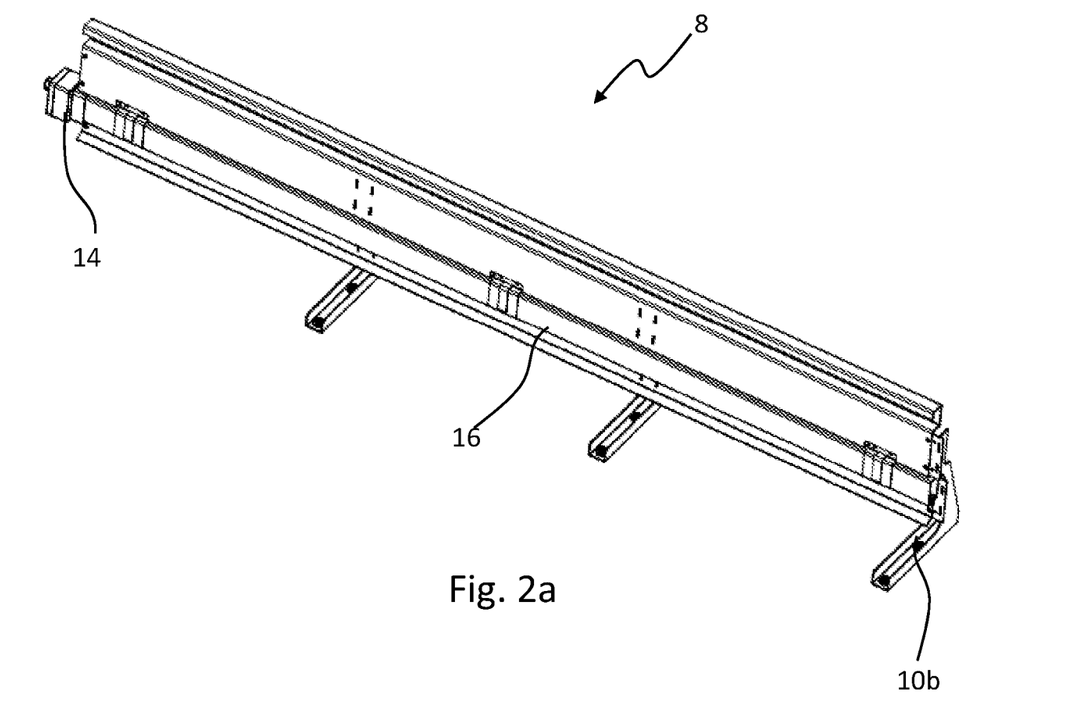
FIG. 2a is a perspective of a rail assembly of a conveyor system.
Figure 2B:
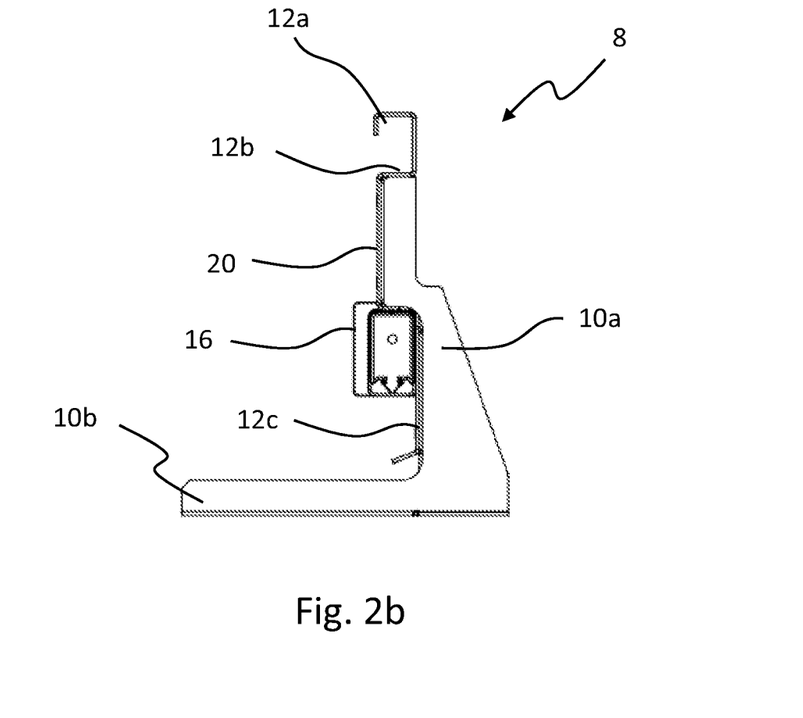
FIG. 2b is a perspective of a rail assembly of a conveyor system seen from the end of the rail assembly.

FIGS. 2a and 2b show perspectives of a rail assembly.

The rail assembly 8 comprises a guide rail 20 formed from a metal plate, which has been formed into shape.

The guide rail 20 comprises an upper track 12a for guiding a transfer conveyor 6, a support track 12b for vertically supporting the transfer conveyor, and a lower track 12c for guiding the transfer conveyor 6.

The upper track 12a, the support track 12b, and the lower track 12c has been shaped into the guide rail 20. The upper track 12a has a U-shaped cross section facing downward. The support track 12b is constituted by a horizontal ledge and the lower track is constituted by a vertical side face of the guide rail 20.

An electric rail 16 is attached to the guide rail 20. The electric rail 16 comprises a current collector for establishing a electric connection between the electric rail 16 and an electric circuitry of the transfer conveyor 6. The current collector is movably mounted inside the electric rail 16 such that the current collector can roll along with the transfer conveyor 6 as the transfer conveyor 6 is moved along the rail assembly 8.

An end piece 14 is provided at an end of the electric rail 16 such that the transfer conveyor 6 comes to a stop if it reaches the end of the rail assembly 8. Together with the end piece is provided an electric plug or socket for electric connecting of the electric rail to a power supply.

The rail assembly comprises a base 10a. The guide rail is bolted or welded together with the base 10a. The base comprises a number of supports 10b for supporting and resting the rail assembly on a building floor of the airport.

Figure 3A:
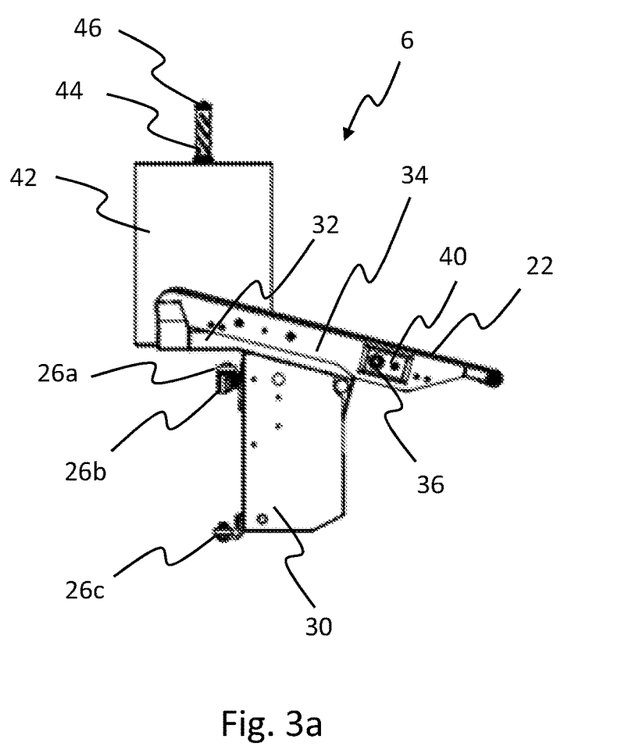
FIG. 3a is a perspective of a transfer conveyor of a conveyor system in a lower retracted state.

FIG. 3a shows a perspective of a transfer conveyor.

In FIG. 3a the transfer conveyor 6 is depicted in a lower retracted state. The transfer conveyor 6 comprises a proximal end relative to the transport unit and a distal end relative to the transport unit. The proximal end constitutes a nose of the belt conveyor and it is closer to the transport unit during intended use of the transfer conveyor than the distal end. The distal end is closer to the unloading belt during intended use of the transfer conveyor than the proximal end. The nose may be placed on the transport unit.

The transfer conveyor 6 comprises a belt conveyor which has a transfer conveyor belt 22 constituting an endless carrier medium for supporting transport items. The transfer conveyor belt 22 is preferably 450 mm wide.

A roller conveyor may be used as an alternative to a belt conveyor.

The belt conveyor has a drive pulley at the distal end an idler pulley at the distal end. The drive pulley is powered by an electric motor and drives the transfer conveyor belt 22 around the drive pulley and the idler pulley whereby baggage placed on the transfer conveyor belt 22 is moved along the belt conveyor.

A hydraulic motor may be used as an alternative to an electric motor.

The belt conveyor has a first frame constituted by a belt frame 34 which structurally supports the drive pulley and the idler pulley. The conveyor belt has a length (measured from the distal end to the proximal end). The belt conveyor has a width (measured in a direction parallel with the extension of the rail assembly). The belt conveyor has a height (measured in a direction orthogonal to the face of the transfer conveyor belt 22 extending between the proximal end and the distal end).

The belt conveyor has a height at the proximal end which is smaller than a height at the distal end. The height of the belt conveyor at the proximal end is as small as possible, for example, the height of the belt conveyor at the proximal end is not more than 15% greater than the diameter of the idler pulley. Since the idler pulley is placed at the proximal end, and the height of the belt conveyor at the proximal end is as small as possible the baggage handler only has to lift a transfer item a short distance before it is on the transfer conveyor belt 22.

The transfer conveyor 6 comprises an emergency stop switch 36 for stopping the movement of the transfer conveyor belt 22.

The belt conveyor is pivotally mounted on an inner frame 32 at the distal end allowing the belt conveyor to be rotated between a lower position and an upper position such that the belt conveyor can be placed at an height that corresponds to a height where transport items on the transport unit is located. When the transfer conveyor is in the lower retracted state it becomes simple and easy for the baggage handler to move transfer items located near a bottom and close to the edge of the transport unit 2a up onto the transfer conveyor belt 22.

The transfer conveyor belt 22 comprises a surface pattern on the surface facing the transfer items for establishing a friction between the transfer conveyor belt 22 and transfer items 2b such that transfer items may be assisted onto the transfer conveyor belt 22.

The inner frame 32 is pivotally mounted on an outer frame 30 at a distance from the distal end. The distance constitutes a radius of a curved trajectory along which the belt conveyor can be moved when the inner frame 32 is rotated. As the inner frame 32 is rotated the belt conveyor can be placed between a retracted position and an extracted position.

An upper wheel 26a, a support wheel 26b and a lower wheel 26c are attached to the outer frame 30. In total the transfer conveyor comprises six wheels: two upper wheels, two support wheels and two lower wheels. When the transfer conveyor 6 is mounted on the rail assembly 8 the upper wheel 26a rolls in the upper guide track 12a, the support wheel 26b rolls in the support track 12b and the lower wheel 26b rolls in the lower guide track 12c as the transfer conveyor 6 is moved along the length of the unloading belt 4. The upper wheel 26a, and the lower wheel 26c has vertical wheel axis, and the support wheel 26b has a horizontal wheel axis.

The transfer conveyor comprises a deflector constituted by a roller deflector 42 for deflecting transport items. The deflector may alternatively be implemented as a railing or a screen.

The roller deflector 42 can rotate about a vertical axis. The roller deflector 42 prevents a transfer item 2b to be pulled away by the unloading belt 4 before the transfer item 2b is all the way onto the unloading belt 4 such that the transfer item 2b does not fall down on the floor.

The roller deflector may be electrical driven and rotate with a fixed speed. The speed may correspond to the speed of the unloading belt 4 or the speed of the transfer conveyor belt 22. Alternatively, the roller deflector may rotate freely as it is contacted by the transfer item 2b.

The roller deflector is placed at a left side or a right side of the transfer conveyor as seen from the proximal end of the transfer conveyor.

The roller deflector is placed at a height above the distal end of the belt conveyor.

The roller deflector extends from the distal end towards the unloading belt, and part of the roller may extend over part of the unloading belt. The roller deflector extends the working area in which the transfer conveyor may operate on transfer items, because as a transfer item reaches the distal end it may come into contact with the roller, which may direct it the rest of the way onto the unloading belt.

The transfer conveyor comprises a handle such that a baggage handler can grip the handle and move the transfer conveyor along the rail assembly. The handle may be on top of the roller deflector such that the baggage handler conveniently can grip the handle. The handle may constitute a deflector handle 44.

The transfer conveyor 6 comprises an electro magnetic brake system with a brake pad for braking the transfer conveyor 6 or keeping the transfer conveyor 6 in a stationary position with respect to the rail assembly 8. When the brake pad 24 is engaged it presses on the rail assembly, thereby creating a static friction between the brake pad 24 and the rail assembly 8. The transfer conveyor 6 comprises a brake switch 46 for operating the brake system, and electronically engaging and disengaging the brake pad. The brake switch 46 is placed on top of the deflector handle 44 such that the brake switch can be easily operated.

Figure 3B:
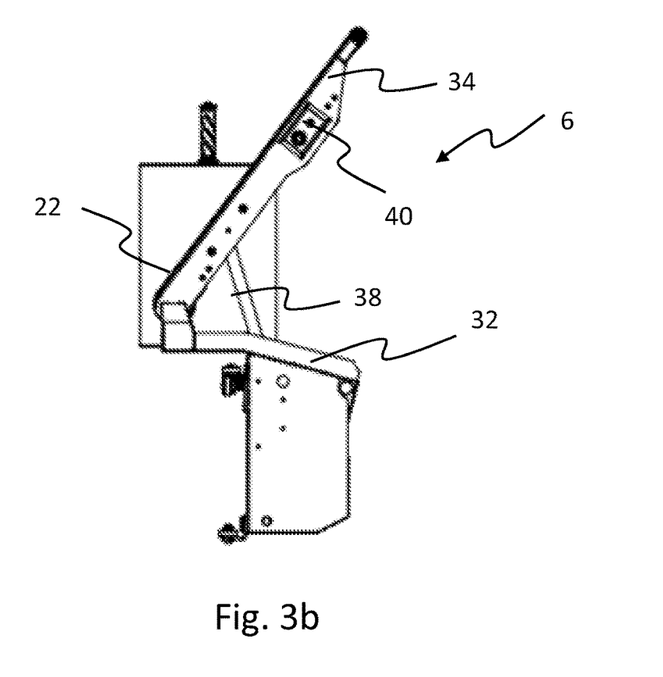
FIG. 3b is a perspective of a transfer conveyor of a conveyor system in a fully retracted state.

In FIG. 3b the transfer conveyor 6 is shown in perspective in an upper retracted state. The transfer conveyor 6 comprises a front shaft 38 for moving the belt conveyor. The front shaft 38 connects the belt conveyor with a first actuator. The first actuator is controlled by a toggle switch 40. By operating the toggle switch 40 the belt conveyor can be moved from a lower position to an upper position or anywhere between the upper position and the lower position.

The pivotal mountings of the belt frame 34 and the inner frame 32 allows the transfer conveyor to be retracted to a fully retracted state where it takes up a minimum of space, which is important, because the transfer conveyor is placed at a fixed height on the rail assembly 8 between the unloading belt 4 and the transport unit 2a, and can therefore not be moved upwards and stored away below a building ceiling.

In a fully retracted state, the belt conveyor has a horizontal projection that is shorter than a length of the outer frame 30 (measured in a direction from the transport unit to the unloading belt). In this way the transfer conveyor may be stored while taking up a minimum of space.

Figure 4A:
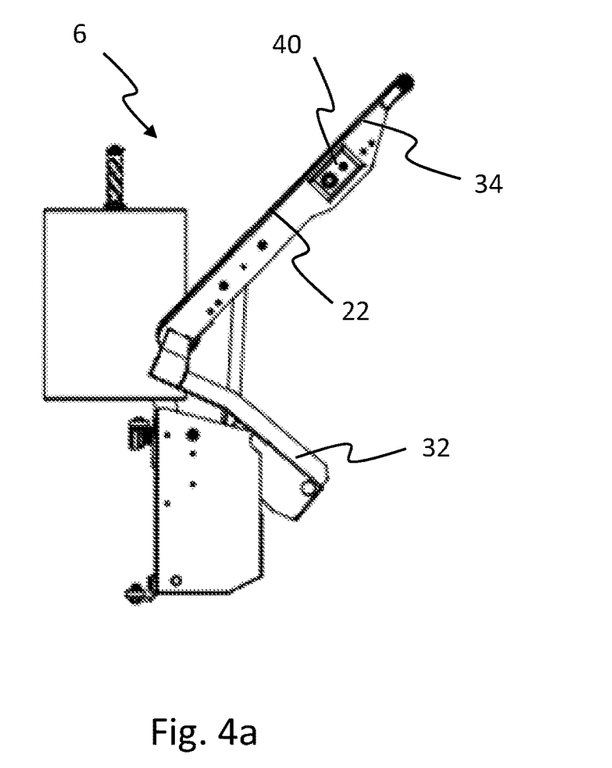
FIG. 4a is a perspective of a transfer conveyor of a conveyor system in an upper extracted state.

In FIG. 4a the transfer conveyor 6 is shown in perspective in an upper extracted state.

The transfer conveyor 6 comprises an inner shaft for supporting the inner frame 32. The inner shaft connects the inner frame with a second actuator. The second actuator is controlled by the toggle switch 40.

By operating the toggle switch 40 the inner frame can be moved from a retracted position to an extracted position or anywhere between the retracted position and the extracted position. When the transfer conveyor is in the upper extracted state it becomes simple and easy for the baggage handler to move baggage located on top of a baggage stack and away from the edge of the transport unit 2a up onto the transfer conveyor belt 22.

The belt conveyor may be placed anywhere between a lower position and an upper position. The lower position constitutes an angle between the belt conveyor and a horizontal plane which is less than 0°. The upper position constitutes an angle between the belt conveyor and a horizontal plane which is between 20° and 60°.

The baggage handler may set the vertical positon of the belt conveyor as the baggage handler desires. If a transfer item is located high on the transport unit it is contemplated that the baggage handler sets the angle of the belt conveyor such that the proximal end of the belt conveyor is at a height that corresponds to the height of the transport item that the baggage handler is to move to the unloading belt.

Figure 4B:
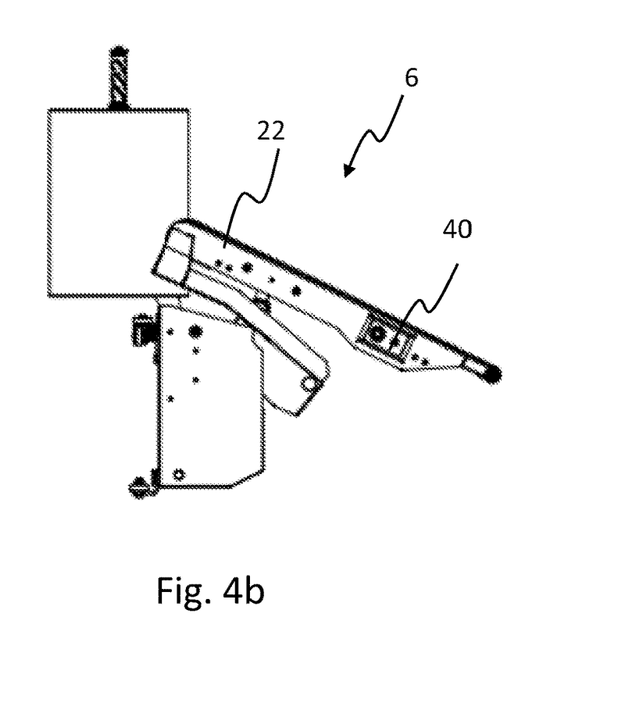
FIG. 4b is a perspective of a transfer conveyor of a conveyor system in a lower extracted state.

In FIG. 4b the transfer conveyor 6 is shown in perspective in a lower extracted state. When the transfer conveyor is in the lower extracted state it becomes simple and easy for the baggage handler to move baggage located near the bottom and away from the edge of the transport unit 2a up onto the transfer conveyor belt 22.

Figure 5A:
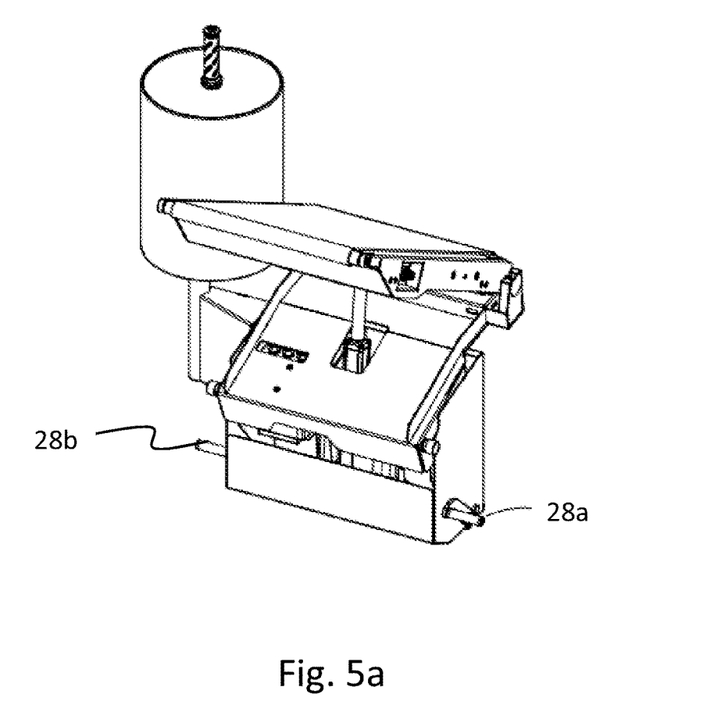
FIG. 5a is a perspective of a transfer conveyor of a conveyor system seen from the front of the transfer conveyor.
Figure 5B:
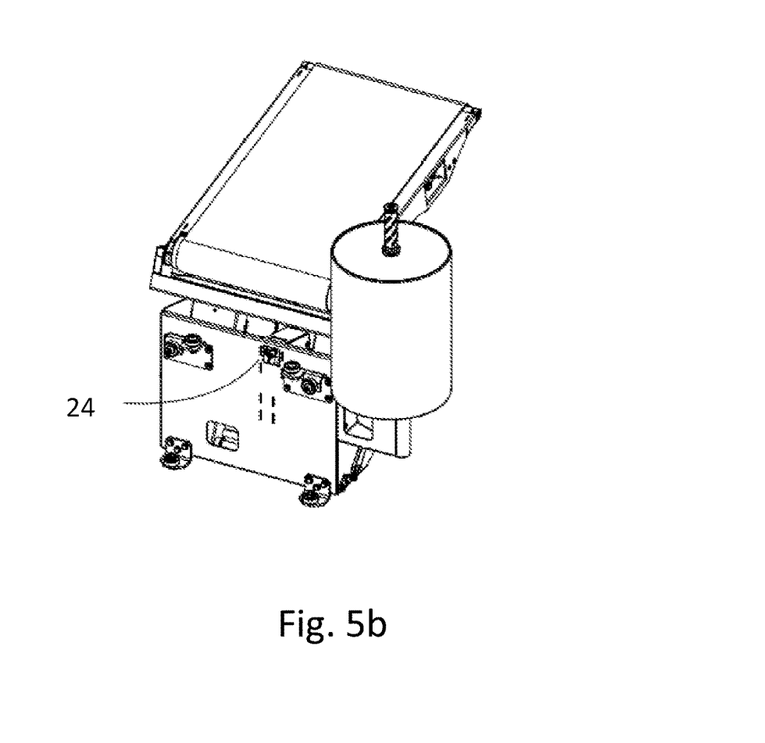
FIG. 5b is a perspective of a transfer conveyor of a conveyor system seen from the back of the transfer conveyor.

FIGS. 5a and 5b shows a transfer conveyor comprising a mechanical brake system.

The brake system comprises a first brake lever 28a for disengaging and engaging a brake pad 24. When the brake lever is pulled down the brake is engaged and when the brake lever is pulled up the brake is disengaged.

The brake system also comprises a second brake lever 28b for disengaging and engaging the brake pad 24. The first brake lever 28a and the second brake lever 28b are connected to a lever axle. The second brake lever 28b may follow the movement of the first brake lever 28a and vice versa.

An end of the first brake lever 28a is provided with a first brake lever knob. The brake lever knob 28a provides grip such that a baggage handler can operate the brake lever 28a with for example a knee without sliding the knee out from the end of the first brake lever 28a. An end of the second brake lever 28b is provided with a second brake lever knob.

The brake pad 24 may be pivotally mounted on a torsion spring. The torsion spring provides a force causing the brake pad to engage to a part of the rail assembly 8 and provide friction between the brake pad and the rail assembly 8.

Figure 6:
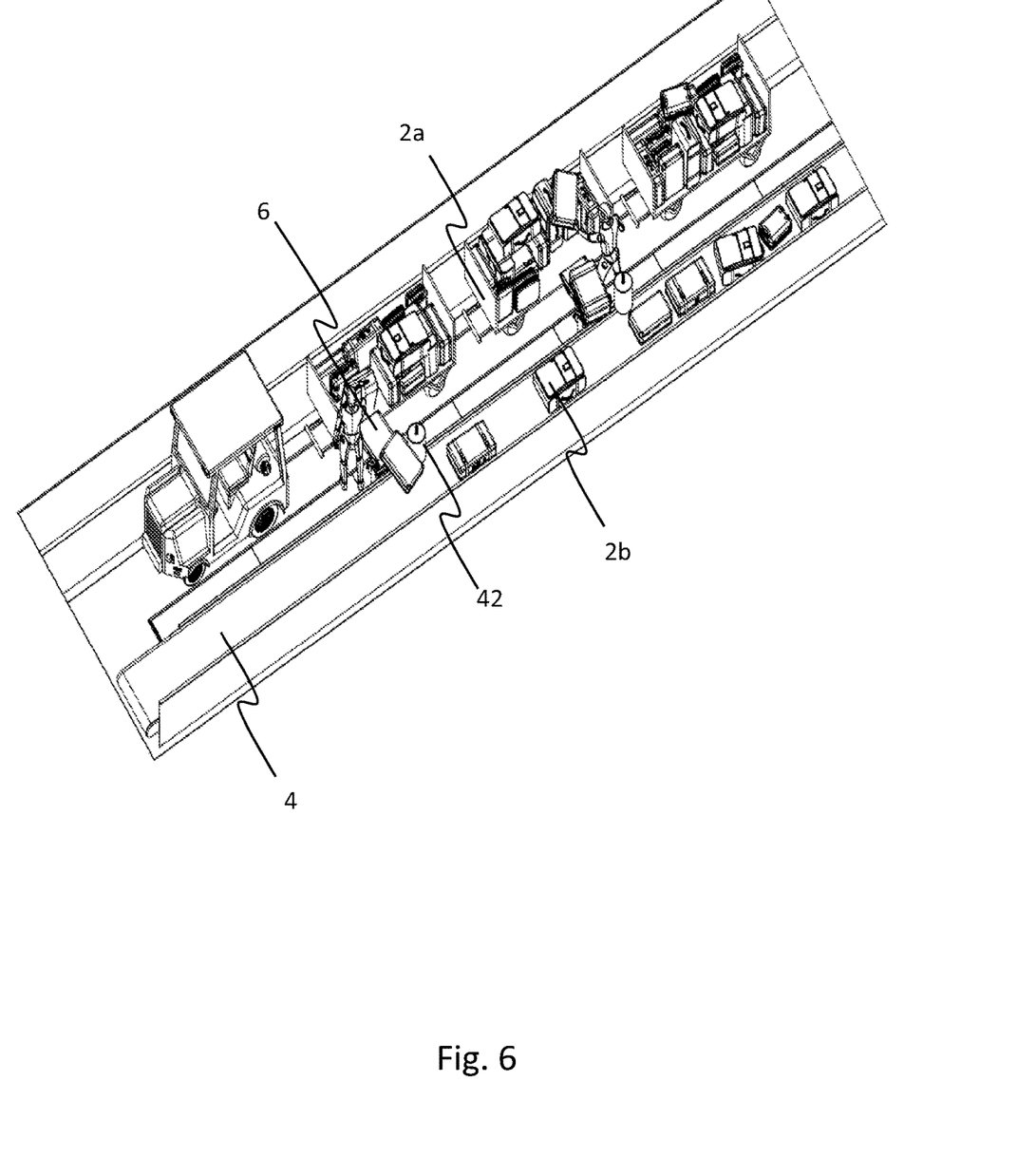
FIG. 6 is a perspective of an unloading area in an airport.

FIG. 6 is a perspective of an unloading area in an airport. Three transport units are parked along an unloading belt 4.

The first transport unit is immediately after a tractor for pulling the train of transport units. Two baggage handlers, each operating a transfer conveyor 6, move transport items 2b from the transport units to the unloading belt 4. The unloading belt moves in a direction from the first transport unit towards the third transport unit.

Figure 7:
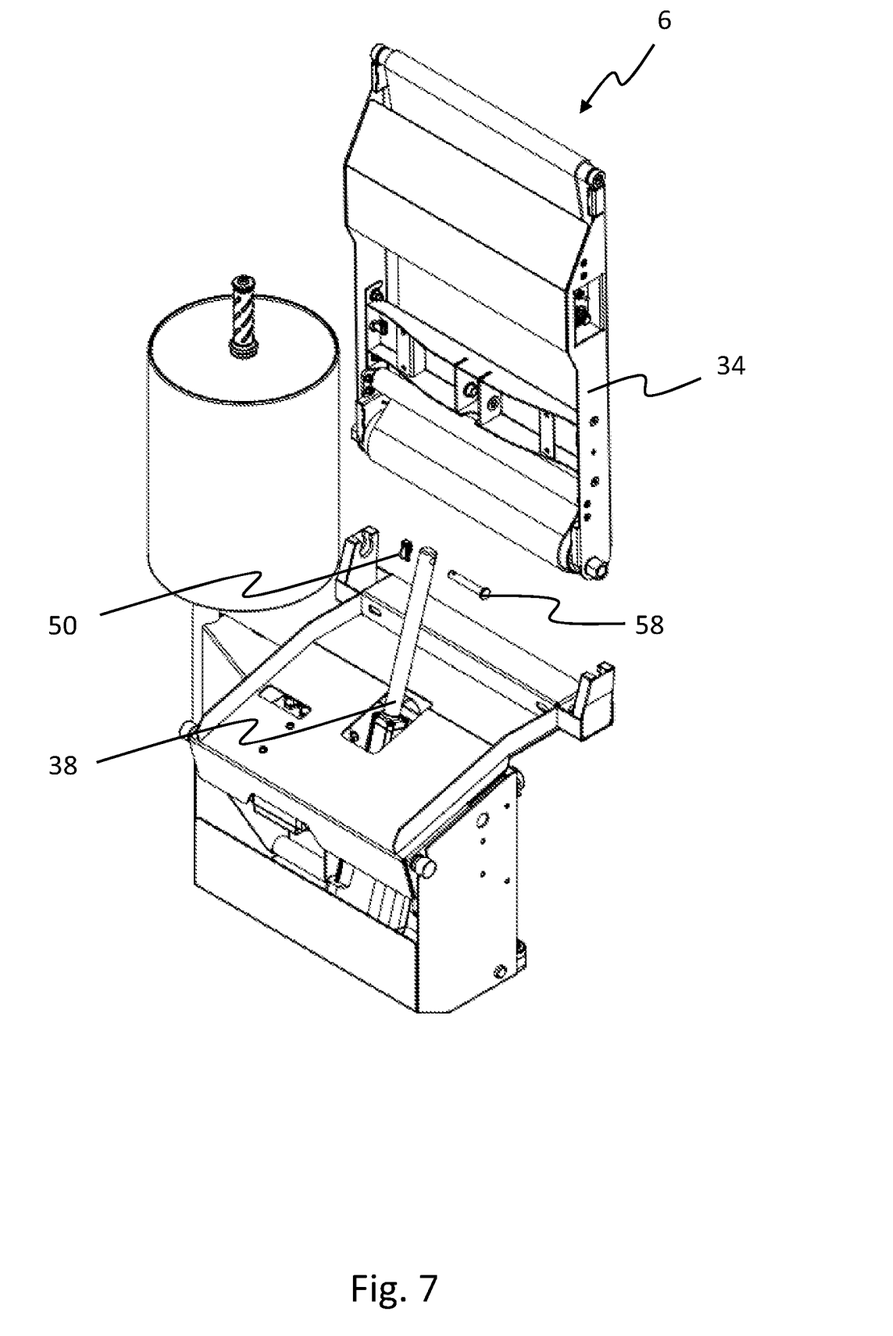
FIG. 7 is a perspective of a belt conveyor and a transfer conveyor detached from each other.

FIG. 7 is a perspective of a belt conveyor and a transfer conveyor detached from each other. The belt conveyor has been removed from the transfer conveyor 6 in order to replace or perform a service on the belt conveyor. The belt conveyor is removed in a four step procedure without the use of tools. The transfer conveyor comprises a locking bolt 58 that goes through a first through hole in the belt frame 34 and a second through hole in the front shaft 38. The transfer conveyor comprises a locking pin 50. The locking pin 50 may be a double-prong pin comprising a first prong and a second prong wherein the first prong is resilient and biased toward the second prong. The locking pin has an extension that is greater than a diameter of the first through hole in the belt frame 34. The locking pin is attached to the locking bolt.

In the first step of removing the belt conveyor, the belt conveyor is moved to its upper most position by extending the front shaft 38 as much as possible.

In the second step the locking pin 50 is removed from the locking bolt 58 and the locking bolt is pulled out. As the locking pin 58 is removed the belt conveyor is no longer locked to the front shaft 38.

In the third step the belt conveyor is moved manually to a vertical position.

In the fourth step the belt conveyor is lifted upwards and removed from the transport conveyor.

Figure 8:
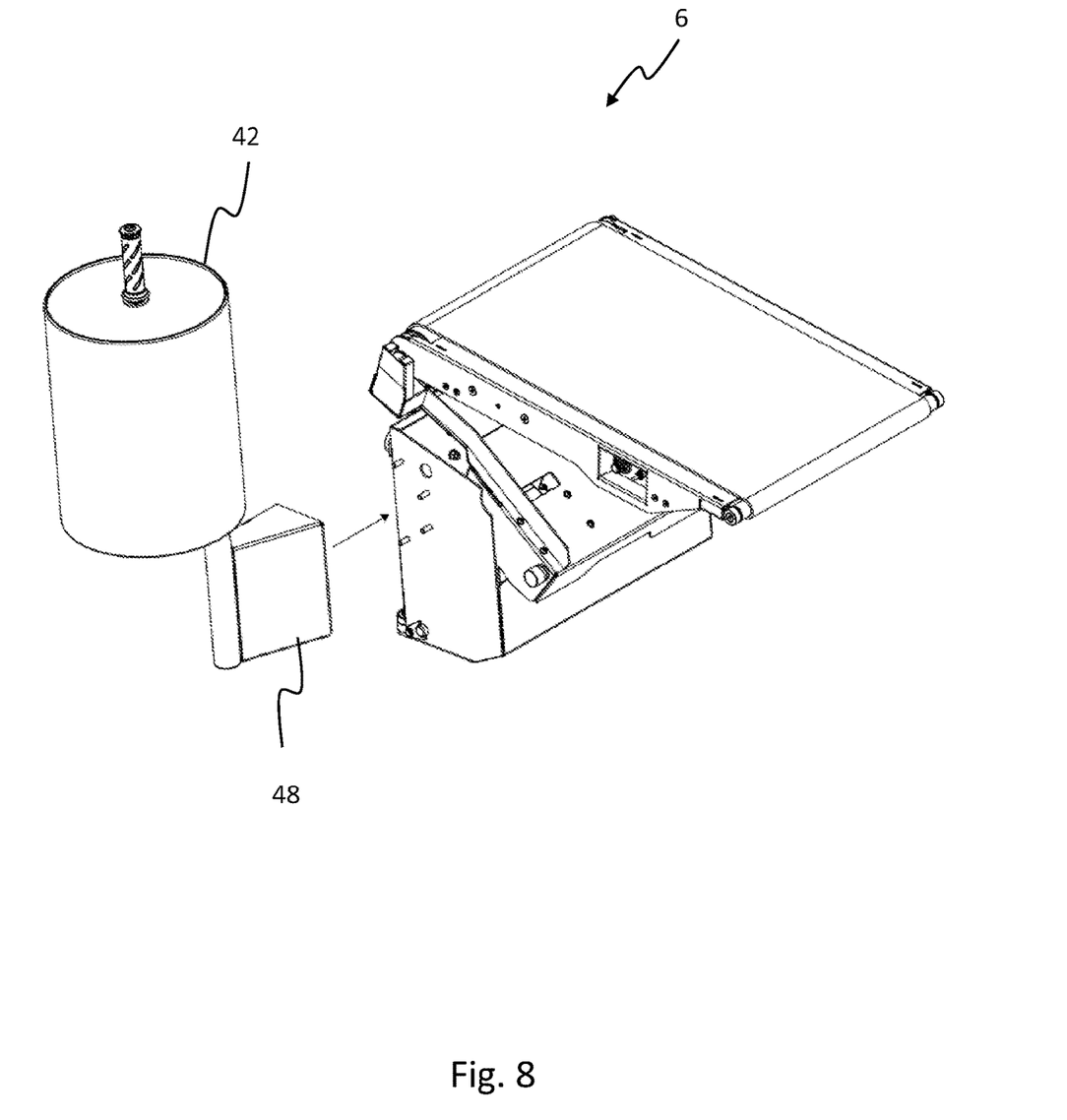
FIG. 8 is a perspective of a roller deflector and a transfer conveyor detached from each other.

FIG. 8 is a perspective of a roller deflector and a transfer conveyor detached from each other. The roller deflector is mounted on a deflector frame 48 constituted by a roller frame. The deflector frame comprises a number of deflector fixtures constituted by roller fixtures for attaching the deflector frame to the outer frame 30.

The deflector fixtures are left/right symmetric with respect to the roller such that the roller deflector may be placed symmetric on the transfer conveyor with respect to a right and a left side as seen from the proximal end of the transfer conveyor.

The deflector frame may be fixed to the outer frame 30 by a number of bolts. In the present context a left/right symmetry means that the placement of the roller om a left side of the transfer conveyor deviates with less than 25% with respect to the placement of the roller on a right side of the transfer conveyor.

The outer frame comprises a left side and a right side as seen from the proximal end of the transfer conveyor. The left side of the outer frame comprises side fixtures such as holes for receiving the bolts when the deflector frame is attached to the left side of the outer frame 30. The right side of the outer frame may also comprise side fixtures such as holes for receiving the bolts when the deflector frame is attached to the right side of the outer frame 30.

In this way the roller may be placed on either side of the transfer conveyor depending on which way the unloading belt moves. When the roller is driven by a motor and the roller is placed on the left side of the transfer conveyor, the roller is driven in a counter clock wise rotation. When the roller is driven by a motor and the roller is placed on the right side of the transfer conveyor, the roller is driven in a clock wise rotation.

Figure 9:
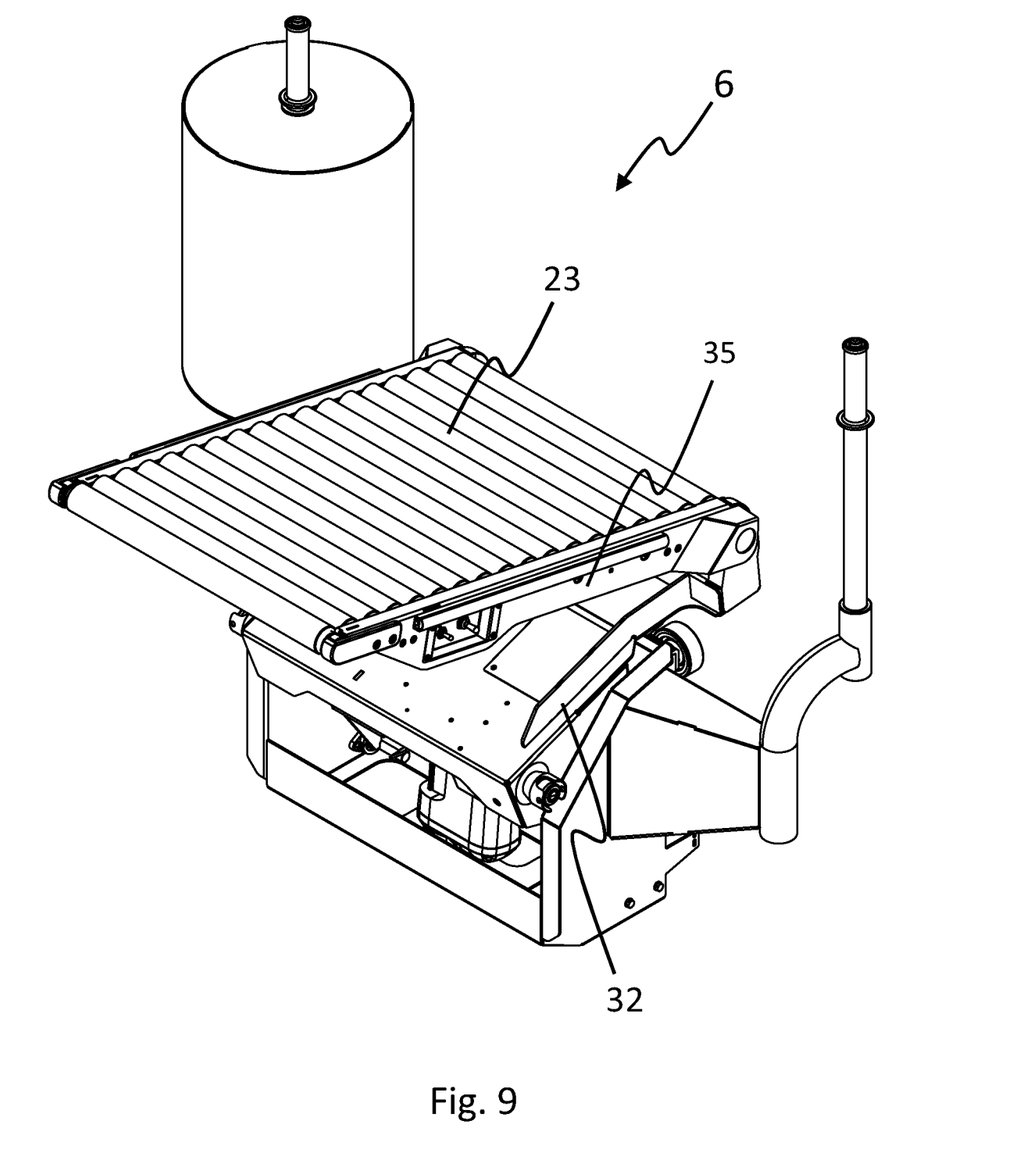
FIG. 9 is a perspective view of a transfer conveyor comprising a roller conveyor with conveying rollers.

FIG. 9 shows a perspective of a transfer conveyor with a roller conveyor. The roller conveyor comprises a conveying roller 23. In total 18 conveying rollers can be seen in FIG. 9. The roller conveyor is preferably 450 mm wide.

The conveying rollers are rotatably mounted to a roller frame 35—each conveying roller is supported by the roller frame at each end of the conveying roller. The conveying rollers extend orthogonal to the transport direction.

Each conveying roller may be driven by a motor such as an electric motor or a hydraulic motor. Alternatively, only a selection of the conveying rollers is driven by a motor, such as half of the conveying rollers may be driven by a motor.

The conveying roller 23 has the shape of a cylinder. The surface material of the conveying roller may be a material providing friction between the outer surface of the conveying roller and a transport item. The material may be polyurethane or PVC.

The conveying roller may have a surface pattern to provide a friction between the outer surface of the conveying roller and the transport item, i.e. the surface pattern may include protrusions such as ribs.

In FIG. 9, the transfer conveyor comprises a roller frame on the right side of the transfer conveyor and a roller frame on the left side of the transfer conveyor. A deflector in the form of a roller deflector is located on the left side roller frame.

In the following is given a list of reference signs that are used in the detailed description of the invention.
W Width of working space
2a Transport unit
2b Transport item
4 Unloading belt
6 Transfer conveyor
8 Rail assembly
10a Base
10b Stand
12a Upper guide track
12b Support track
12c Lower guide track
14 End piece
16 Electric rail
18 Work floor mat
20 Guide rail
22 Transfer conveyor belt
23 Conveying roller
24 Brake pad
26a Upper wheel
26b Support wheel
26c Lower wheel
28a First brake lever
28b Second brake lever
30 Outer frame
32 Inner frame
34 Belt frame
35 Roller frame
36 Emergency stop switch
38 Front shaft
40 Toggle switch
42 Roller deflector
44 Deflector handle
46 Brake switch
48 Deflector frame
50 Locking pin
58 Locking bolt

The invention claimed is:

1. A conveyor system for transferring transport items (2b) between a transport unit (2a) and a loading area or an unloading belt (4) of a baggage handling conveyor system in an airport, said conveyor system comprising:

a rail assembly (8) for placement adjacent said loading area or unloading belt (4), and at least one transfer conveyor (6) for placement on, and moving along said rail assembly (8);
wherein said rail assembly (8) comprises:
a guide rail (20) for guiding said transfer conveyor (6) along said rail assembly (8), and
a mounting means for mounting said rail assembly (8) between said transport unit (2a) and said loading area or unloading belt (4),
wherein said transfer conveyor (6) comprises:
a carrying means having a transfer conveyor medium (22, 23) for transporting and supporting said transport items (2b), and a first frame constituting a conveyor frame for supporting said transfer conveyor medium (22, 23),
wherein said transfer conveyor medium comprises (22, 23) an outer surface for facing said transport items (2b), said outer surface having a surface pattern for providing a static friction between said carrying means and said transport items (2b) when said transport items being in contact with said surface pattern,
said transfer conveyor (6) further comprising:
a first end, and a second end opposite said second end, and
a motor for driving said conveyor medium such that said transports items being assisted onto said carrying medium by means of said surface pattern and moved between said first end and said second end as said conveyor medium being driven by said motor.

2. The conveyor system according to claim 1, wherein the surface pattern of the outer surface of the conveyor medium (22, 23) is selected from the group of protrusion patterns consisting of rib-, grass pattern-, corrugated-, spike shaped-, saw tooth shaped- and crescent shaped-protrusion patterns.

3. The conveyor system according to claim 1, said mounting means including a base (10a) comprising at least one support for mounting said rail assembly (8) on a building floor.

4. The conveyor system according to claim 1, said rail assembly (8) being mounted to an unloading belt frame (34).

5. The conveyor system according to claim 1, said motor being an electric motor or an hydraulic motor.

6. The conveyor system according to claim 1, said transfer conveyor (6) comprising a roller conveyor with a conveying roller (23).

7. The conveyor system according to claim 6, said roller conveyor comprising a plurality of conveying rollers (23).

8. The conveyor system according to claim 1, said transfer conveyor (6) comprising a belt conveyor.

9. The conveyor system according to claim 1, said transfer conveyor (6) comprising a deflector for deflecting transport items (2b).

10. The conveyor system according to claim 9, said deflector comprising a roller (42) for rotating around a vertical axis.

11. The conveyor system according to claim 1, said transfer conveyor (6) comprising a brake system for braking said transfer conveyor or keeping said transfer conveyor in a stationary position with respect to said rail assembly (8).

12. The conveyor system according to claim 1, said system comprising a second or inner frame (32) being slideable mounted on said rail assembly (8) for sliding said transfer conveyor (6) along said rail assembly.

13. The conveyor system according to claim 12, said transfer conveyor (6) comprising a third frame, said second frame being pivotally connected to said third frame for moving said second frame between a retracted position and an extracted position.

14. The conveyor system according to claim 13, said third frame being slideable mounted on said rail assembly (8) for sliding said transfer conveyor (6) along said rail assembly.

15. The conveyor system according to claim 1, said rail assembly (8) comprising an electric rail (16) for providing power to said transfer conveyor (6).

16. The conveyor system according to claim 1, comprising more than one transfer conveyor.

17. The conveyor system according to claim 2, said mounting means including a base (10a) comprising at least one support for mounting said rail assembly (8) on a building floor.

18. The conveyor system according to claim 2, said rail assembly (8) being mounted to an unloading belt frame (34).

19. The conveyor system according to claim 2, said motor being an electric motor or a hydraulic motor.

20. The conveyor system according to claim 3, said motor being an electric motor or a hydraulic motor.

\* \* \* \* \*